United States Patent [19]

Ballova et al.

[11] 4,155,956

[45] May 22, 1979

[54] PROCESS FOR PRODUCING SHOCK-PROOF GRAFT COPOLYMERS OF STYRENE WITH SYNTHETIC RUBBER

[76] Inventors: Galina Ballova, prospekt Energetikov, 60, kv. 198; Sergei S. Ivanchev, Nalichnaya ulitsa 36, korpus 3, kv. 97; Olga N. Romantsova, ulitsa Tukhachevskogo, 37, kv. 25; Larisa F. Maladzyanova, Svetlanovsky prospekt, 72, korpus 1, kv. 174; Ekaterina I. Egorova, Piskarevsky prospekt 9, korpus 3, kv. 85; Valentina G. Karmakova, Vyborgskoe shosse 16, kv. 2; Marta P. Potiforova, ulitsa Vernosti 38, korpus 3, kv. 15; Ljudmila N. Trushkina, Oktyabrskaya naberezhnaya, 84, korpus 4, kv. 56, all of Leningrad, U.S.S.R.

[21] Appl. No.: 777,405

[22] Filed: Mar. 14, 1977

[51] Int. Cl.$^2$ ............................................. C08F 279/02
[52] U.S. Cl. .................................. 260/880 R; 526/228
[58] Field of Search ........... 260/880 R, 544 F, 544 Y; 526/231, 228

[56] References Cited

U.S. PATENT DOCUMENTS

| | | | |
|---|---|---|---|
| 2,559,630 | 7/1951 | Bullitt | 526/231 |
| 2,792,423 | 5/1957 | Young | 526/231 |
| 3,671,651 | 6/1972 | D'Angelo | 260/880 R |
| 3,919,355 | 11/1975 | Ballova | 260/880 R |
| 3,991,109 | 11/1976 | D'Angelo | 260/880 R |

*Primary Examiner*—Paul R. Michl
*Attorney, Agent, or Firm*—Lackenbach, Lilling & Siegel

[57] ABSTRACT

The process for producing shock-proof graft copolymers of styrene with synthetic rubber consists in that rubber is dissolved in styrene at a maximum temperature of 75° C. The resultant solution is subjected to prepolymerization by being heated to 75–85° C. in the presence of a plasticizer and a peroxide initiating agent. The peroxide initiator is essentially a composition of the following formulation (in parts by weight): diacylated peroxides of aliphatic acids $C_3$–$C_5$, 2 to 8; diacylated peroxides of aliphatic acids $C_6$–$C_9$, 80 to 89; diacylated peroxides of aliphatic acids $C_{10}$–$C_{12}$, 7 to 14. The prepolymerization process proceeds until the 25–40 percent styrene conversion. The result is the prepolymer which is exposed to aqueous-suspension polymerization by being heated in an aqueous medium to maximum 140° C. at a prepolymer-to-water volume ratio ranging within 5:3 and 10:3, respectively, in the presence of peroxide polymerization; initiators and a stabilizing system, consisting of 0.15–1.5 wt. % tricalcium phosphate, 0.003–0.02 wt. % of a mixture of disubstituted sodium alkylsulphates of a general formula as such: R—O—$SO_3$Na, where R is a hydrocarbon radical, containing 8 to 18 carbon atoms, and 0.15–0.35 wt. % calcium carbonate.

The process is distinguished for a simple flowsheet; it involves no molecular-weight modifier. Copolymers produced according to the proposed process feature high physico-mechanical characteristics.

7 Claims, No Drawings

PROCESS FOR PRODUCING SHOCK-PROOF GRAFT COPOLYMERS OF STYRENE WITH SYNTHETIC RUBBER

The present invention relates to processes for producing shock-proof graft copolymers of styrene with synthetic rubber.

Said copolymers find extensive application in manufacturing a variety of technical items and diverse consumer goods. Thus, for instance, they ae used for making the components of the inside lining of domestic refrigerators, for packing foodstuffs, manufacturing cabinets and components of TV- and radio-sets, magnetic tape recorders, making component parts used in automobile industry, as well as a diversity of illumination-engineering items and domestic-use goods.

Shock-proof graft copolymers of styrene with synthetic rubber featuring an optimum structure and best physico-mechanical characteristics are known to be produced largely by the block-and-suspension method. The method includes dissolving rubber in styrene, heating the resulting solution until the 25–40 per cent monomer conversion (prepolymerization), and aqueous-suspension polymerization of the prepolymer.

It is the viscosity of prepolymer that has a great influence in carrying out the aforesaid process. Reduced prepolymer viscosity results in better heat-transfer conditions in the entire polymerization process and also facilitates dispersion of the rubber particles in polystyrene at the stage of prepolymerization and prepolymer suspending in the aqueous phase at the stage of suspension polymerization.

The prepolymer viscosity can be reduced by, say, adding some molecular-weight modifiers such as mercaptans, performed at the beginning of the prepolymerization process or during the 2–15 percent conversion of the monomer. With the same view use can also be made of mercaptans in combination with chelate-forming agents, such as ethylenediaminetetraacetic acid or citric acid.

One prior-art process is known for producing shockproof graft copolymers of styrene with synthetic rubber, such as butadiene. The process consists in that the synthetic rubber is dissolved in styrene at a temperature not over 80° C. under constant stirring till a complete dissolution of the rubber, whereupon the resultant solution is subjected to bulk prepolymerization in the presence of a plasticizer and molecular-weight modifier. Used as a plasticizer can be liquid medicinal petrolatum or butylstearate, and as a molecular-weight modifier can be normal laurylmercaptan. Prepolymerization is carried out in the presence of a peroxide initiating agent, i.e., benzoyl peroxide at 85°–90° C. The above stage can also be run without a peroxide initiator; in such a case the prepolymerization reaction occurs at 115°–125° C. The resultant prepolymer is then exposed to aqueous-suspension polymerization at a water-prepolymer volume ratio from 5:3 to 10:3. The aqueous-suspension polymerization is conducted at a maximum temperature of 140° C. in the presence of peroxide polymerization initiators and a stabilizing system, consisting of 0.15–1.5 wt.% tricalcium phosphate, 0.003–0.02 wt.% of a mixture of disubstituted sodium alkylsulphates having a general formula as such: R—OSO$_3$Na, where R is a hydrocarbon radical, containing 8 to 18 carbon atoms and 0.15–0.35 wt.% calcium carbonate. Used as a peroxide initiator is a system, consisting of benzoyl peroxide and tertbutylperbenzoate.

With a view to reducing the viscosity of the reaction medium the molecular-weight modifier, i.e., normal lauryl-mercaptan, is added in four or five steps (upon dissolving of the rubber in styrene and every hour after the initiation of the prepolymerization reaction.

Stepwise addition of the molecular-weight modifier is advantageous over once-through introduction in being a more potent diluent capable of reducing to a lower extent the viscosity of the system and improving physico-mechanical characteristics of the finished product. However, addition of mercaptans to the system is followed by a considerable heat evolution, occurring at the beginning of the polymerization process (till the 15–17 per cent monomer conversion which involves additional cooling of the system.

The process for production of extra-shockproof copolymers is known to require an increased (over 5 wt.%) rubber content in the copolymer. However, higher content of rubber (up to 6 wt. % or over) results in much higher viscosity of the prepolymer (despite an addition of a molecular-weight modifier. As a result, heat-exchange process and dispersion of the prepolymer in the aqueous phase are impeded which adversely affects the properties of the copolymer. Moreover, all mercaptans feature pungent and disagreeable odor which adds to much troubles in handling these substances. An excess amount of mercaptan might affect toxicological properties of the finished product.

It is an essential object of the present invention to provide such a process for producing shock-proof graft copolymers of styrene with synthetic rubber that would make it possible to attain a better control over the prepolymerization process without applying a molecular-weight modifier, and facilitate dispersion of the prepolymer at the stage of polymerization.

In keeping with said and other objects the invention resides in that synthetic rubber is dissolved in styrene at a maximum temperature of 75° C., the resultant solution is subjected to prepolymerization at elevated temperatures in the presence of a plasticizer and a peroxide initiator, until 25–40 percent of the styrene is converted to form the prepolymer which is then exposed to an aqueous suspension polymerization by being heated in an aqueous medium to maximum 140° C., the water-prepolymer volume ratio being from 5:3 to 10:3, respectively in the presence of peroxide polymerization initiators and a stabilizing system, consisting of 0.15–1.5 wt. % tricalcium phosphate, 0.003–0.02 wt.% of a mixture of disubstituted sodium alkylsulphates of a general formula as such: R—OSO$_3$Na, where R is a hydrocarbon radical, containing 8 to 18 carbon atoms, and 0.15–0.35% wt.% calcium carbonate. According to the invention used as a peroxide initiator at the stage of prepolymerization is a peroxide composition incorporating diacylated peroxides of aliphatic acids $C_3$–$C_{12}$, taken at the following weight-part ratio:

diacylated peroxides of aliphatic acids $C_3$–$C_5$—2-8
diacylated peroxides of aliphatic acids $C_6$–$C_9$—80-89
diacylated peroxides of aliphatic acids $C_{10}$–$C_{12}$—7-14 and the prepolymerization process runs at 75°–85° C.

Used as synthetic rubbers may be such as butadiene, butadiene-styrene, block-copolymer of styrene with divinyl, and the like. Prepolymerization occurs in the presence of a plasticizer in the capacity of which use may be made of, say, butylstearate, mineral or naphthene oils, etc. The prepolymerization initiators are in fact some peroxide compositions, consisting of diacyl peroxides of aliphatic fatty acids $C_3$–$C_{12}$, the principal fraction of which is one of $C_6$–$C_9$ (80–89 weight parts), while the content of the fraction $C_3$–$C_5$ in the peroxide composition ranges between 2 and 8 weight parts, and that of the fraction $C_{10}$–$C_{12}$, between 7 and 14 weight parts. Any variation of the content of the above fractions in the peroxide compositions within the aforesaid limits does not affect the rate of initiation. Application of the peroxide compositions of the afore-specified content of fractions enables the prepolymerization process to be run at lower temperatures without resorting to a molecular-weight modifier. At the stage of aqueous-suspension polymerization use is made of the heretofore-known initiating systems, such as benzoyl peroxide in combination with tertbutylperbenzoate, ditertbutyl peroxide, dicumyl peroxide, carbotertbutylperoxysuccinyl, and the like.

Apart from the aforestated conventional initiating systems, use may also be made at the stage of aqueous-suspension polymerization of some peroxide compositions, containing diacylated peroxides of aliphatic acids $C_3$–$C_{12}$ in combination with a high-temperature peroxide initiating agent.

It is recommended that use be made of the following peroxide compositions (in parts by weight):

| | | |
|---|---|---|
| (1) diacylated peroxides of aliphatic acids | $C_3$–$C_5$ | - 2 |
| diacylated peroxides of aliphatic acids | $C_6$–$C_9$ | - 89 |
| diacylated peroxides of aliphatic acids | $C_{10}$–$C_{12}$ | - 9 |
| (2) Diacylated peroxides of aliphatic acids | $C_3$–$C_5$ | - 6 |
| Diacylated peroxides of aliphatic acids | $C_6$–$C_9$ | - 80 |
| Diacylated peroxides of aliphatic acids | $C_{10}$–$C_{12}$ | - 14 |
| (3) Diacylated peroxides of aliphatic acids | $C_3$–$C_5$ | - 8 |
| Diacylated peroxides of aliphatic acids | $C_6$–$C_9$ | - 80 |
| Diacylated peroxides of aliphatic acids | $C_{10}$–$C_{12}$ | - 1 |

It is expedient that use be made of tertbutylperbenzoate peroxide or tertbutyl peroxide as a high-temperature initiator.

The peroxide composition made use of in the proposed process possesses, alongside with initiating properties, also modifying ones which permits the process to be carried out without any molecular-weight modifiers; this provides for a reduced viscosity of the system at the stage of prepolymerization, as well as the required molecular mass and mass distribution of the polymer in the finished product. Furthermore, dispersion of the polymer at the stage of suspension polymerization becomes easier.

Benzoyl peroxide applicable in the prior-art processes, is used in a wetted state, the moisture content being from 10 to 30 wt.%. This interferes with an accurate proportioning of the initiator and may thus affect the rate of the process operation and physico-mechanical characteristics of the finished product. Unlike benzoyl peroxide the peroxide composition mentioned above is capable of establishing the initiator concentration as prescribed by the formulation.

It is owing to the use of the above peroxide composition that the prepolymerization process proceeds at higher rates, and the finished product is featured by excellent physico-mechanical characteristics.

The proposed process allows production of graft copolymers of styrene with synthetic rubbers, such as polybutadienes of various structures, butadiene-styrene, isoprene rubbers, as well as block-copolymers of styrene with divinyl, the rubber content in the finished product being as high as 13 wt.%.

The technology of the process is simple and is carried out as follows.

Preparing the Peroxide Composition

A mixture of aliphatic-acid chlorides is obtained by conventional techniques from the fractions of normal-structure aliphatic acids having 3 to 12 carbon atoms. Then hydrogen peroxide is acylated with the aforesaid mixture of aliphatic-acid chlorides to produce the peroxide composition as desired. The reaction of acylation of hydrogen peroxide proceeds in an aqueous-alkaline medium as follows. The reaction vessel is filled with water and caustic-soda solution, whereupon some ice is added under stirring; then an aqueous hydrogen-peroxide solution is poured at a temperature kept within +4° to +6° C. Next a dispersing agent is added to the reaction mixture, followed by introducing a mixture of acid chlorides under stirring. Used as a disperser may be methylethylketone or some surfactants. When adding acid chlorides the temperature of the reaction mixture is maintained within −1° to +3° C. Once acid chlorides have been added, the reaction mixture is kept under stirring for a while; the pH value being within 9 to 14. Once having been stirred the reaction mixture is stratified, the bottom layer is separated, while the top (peroxide) layer is washed two times with an alkali solution, then with water till the neutral reaction occurs. The washed-up peroxide composition is dried with magnesium sulphate to obtain a mixture of diacyl peroxides of aliphatic acids having a hydrocarbon radical chain length equal to $C_3$–$C_{12}$.

Thereupon, charged into the reaction vessel under constant stirring are styrene and synthetic rubber. The reactor contents are heated to maximum 75° C. and allowed to stand at that temperature till a complete dissolution of the rubber. This done, added to the reactor are the plasticizer and peroxide initiator. The reaction mixture is heated to 75°–85° C. and is kept under these conditions till the 25–40 percent monomer conversion (that is, prepolymerization). The result is the prepolymer which is then exposed to the aqueous-suspension polymerization. This can be carried out by both direct- and reverse-order charging, viz., the prepolymer is loaded into the reactor, containing the aqueous phase (i.e., water and the stabilizing system), or conversely, the aqueous phase is added to the prepolymer at a preselected prepolymer-to-water ratio within 5:3 to 10:3, respectively. The stabilizing system consists of tricalcium phosphate, disubstituted sodium alkylsulphate and calcium carbonate. The aqueous-suspension polymerization is carried out at a maximum temperature of 140° C. in the presence of the peroxide initiators which are introduced into the system after termination of the prepolymerization stage. Upon completion of the process the resultant polymer is washed off from the stabilizer by adding some hydrochloric acid till decomposing $Ca_3(PO_4)_2$, centrifugal-separated and dried.

For a better understanding of the essence of the present invention, some examples of its practical embodiment will hereinafter be considered.

EXAMPLE 1

To prepare the oil phase, charged into a 50-liter vessel provided with a paddle stirrer, under constant stirring are styrene and butadiene rubber featuring lower cold-flow temperature (the formulation of the charge being specified below), whereupon the rubber is allowed to dissolve at 70°–75° C. for 2–3 hours. When the dissolution is completed, a plasticizer (butylstearate or liquid medicinal petrolatum) is added into the digester.

Prepolymerization proceeds for 5 hours at 75°–85° C. in the presence of the peroxide composition (0.23 weight part of the oil phase) of the following formulation (in parts by weight):

| diacylated peroxides of aliphatic acids | $C_3$–$C_5$ – 2 |
| diacylated peroxides of aliphatic acids | $C_6$–$C_9$ – 89 |
| diacylated peroxides of aliphatic acids | $C_{10}$–$C_{12}$ – 9 |

The prepolymer viscosity (after Fordwick) equals 41 seconds, the styrene conversion percentage being 27.

The thus-obtained prepolymer is pump-transferred into another reaction vessel provided with a stirrer and containing the preliminarily prepared aqueous phase which consists of calcium phosphate obtained by decanting the solutions of sodium phosphate and calcium chloride, disubstituted sodium alkylsulphate and calcium carbonate, the volume ratio of the prepolymer to water being 5:3.

The prepolymer having been charged, the aforesaid peroxide composition is added in an amount of 0.36 weight part, as well as tertbutylperbenzoate in an amount of 0.19 weight part with respect to the oil phase.

The formulation of the charge in parts by weight is as follows:

| Oil phase: | Aqueous phase: |
|---|---|
| styrene 143.6 | water 99.4 |
| butadiene rubber 7.7 | tricalcium phosphate 0.6 |
| liquid medicinal petrolatum 3.1 | disubstituted sodium alkylsulphate 0.003 |
| peroxides of aliphatic-acid fraction 0.59 | calcium carbonate 0.15 |
| tertbutylperbenzoate 0.19 | |

Next the reactor contents are blown through with nitrogen, whereupon the temperature is raised to 130° C. within 5 hours (in steps of 80°–90°–100°–115°–130° C.), and the reaction mixture is kept at 130° C. for two hours.

The process is stable, neither sticking nor agglomeration of the reactants being observed. The thus-obtained product features high physical and mechanical characteristics:
Charpy notched impact strength—9.5 kgf-cm/cm$^2$
residual monomer content—0.04 wt.%
percentage elongation—36
flow melt index—2.1 g/10 min
Vicat's softening point—101° C.

CONTROL EXAMPLE

The process is carried out under the conditions similar to those of Example 1 with the sole exception that used as the initiator at the stage of prepolymerization is benzoyl, peroxide, taken in an amount of 0.11 weight part.

The prepolymerization reaction proceeds at 90° C. for 4 hours till the 30-percent styrene conversion. The molecular-weight modifier, viz., normal laurylmercaptan (0.05 weight part) is added in equal portions every hour after the commencement of the polymerization reaction.

As a periodic mercaptan charging results in temperature elevation, cold water is fed into the reactor jacket. The Fordwick's viscosity of the prepolymer equals 70–80 seconds.

At the stage of aqueous-suspension polymerization added to the reaction mixture are benzoyl peroxide (0.35 weight part) and tertbutylperbenzoate (0.19 weight part), both in terms of the oil phase.

The finished product thus obtained features the following characteristics:
Charpy notched impact strength—9.8 kgf-cm/cm$^2$
residual monomer content—0.05 wt.%
percentage elongation—35
flow melt index—3.0 g/10 min
Vicat's softening point—101° C.

CONTROL EXAMPLE

The process is conducted under the conditions similar to those of Example 1, with the exception that prepolymerization of styrene with rubber in the presence of the peroxide of synthetic fatty-acid fraction (0.23 weight part) is carried out at 75° C. for 10 hours till the 27-percent styrene conversion. The Fordwick's prepolymer viscosity is 65 seconds the physico-mechanical characteristics of the finished product being the same as of the polymer described in Example 1.

EXAMPLE 2

The process is run under the conditions similar to Example 1, with the exception that the rubber is used in an amount of 9.3 weight parts. Prepolymerization proceeds at 75°–85° C. for 4 hours till the 27-percent styrene conversion, the Fordwick's prepolymer viscosity being 154 seconds.

The product obtained features the following physico-mechanical characteristics:
Charpy notched impact strength—10.5 kgf-cm/cm$^2$
residual monomer content—0.02 wt.%
flow melt index—2.0 g/10 min
percentage elongation—40
Vicat's softening point—100° C.

CONTROL EXAMPLE

The process proceeds under the conditions similar to Example 2, with the exception that used as the initiator at the stage of prepolymerization is benzoyl peroxide, taken in an amount of 0.11 weight part of the oil phase. Prepolymerization occurs at 90° C. for 4 hours till the 27-percent styrene conversion. The molecular-weight modifier, viz., normal laurylmercaptan (0.05 weight part) is introduced in equal parts every hour after the beginning of polymerization.

As mercaptan is periodically charged into the reactor, temperature elevation occurs therein, and cold water is therefore fed into the reactor jacket. The Fordwick's viscosity of the prepolymer is 300 seconds.

At the stage of aqueous-suspension polymerization added to the reaction mixture are benzoyl peroxide (0.36 weight part) and tertbutylperbenzoate (0.19 weight part), both in terms of the oil phase.

The product thus obtained features the following characteristics:
Charpy notched impact strength—11.1 kgf-cm/cm$^2$
percentage elongation—38
flow melt index—2.6 g/10 min
residual monomer content—0.06 wt.%
Vicat's softening point—99° C.

EXAMPLE 3

The process runs under the conditions similar to Example 1, with the exception that rubber is used in an amount of 9.3 weight parts and the peroxide composition is introduced as an initiator in an amount of 0.775 weight part of the oil phase, its formulation (in parts by weight) being as follows:

| diacylated peroxides of aliphatic acids | $C_3$–$C_5$ – 6 |
|---|---|
| diacylated peroxides of aliphatic acids | $C_6$–$C_9$ – 80 |
| diacylated peroxides of aliphatic acids | $C_{10}$–$C_{12}$ – 14 |

Prepolymerization process occurs at 75°–85° for 4 hours till the 30-percent styrene conversion, the Fordwick's viscosity of the prepolymer being 104 seconds. Aqueous-suspension polymerization proceeds similar to Example 1, in the presence of the peroxide composition of the aforestated formulation (0.078 weight part) and tertbutylperbenzoate (0.19 weight part), both in terms of the oil phase.

The product thus yielded has the following physico-mechanical characteristics:
Charpy notched impact strength—11.5 kgf-cm/cm$^2$
residual monomer content—0.05 wt.%
flow melt index—3.7 g/10 min
percentage elongation—37
Vicat's softening point—96° C.

EXAMPLE 4

The process runs under the conditions similar to Example 1, with the exception that used as the initiator at the stage of prepolymerization is the peroxide composition (0.15 weight part of the oil phase) of the following composition (in parts by weight):

| diacylated peroxides of aliphatic acids | $C_3$–$C_5$ – 8 |
|---|---|
| diacylated peroxides of aliphatic acids | $C_6$–$C_9$ – 80 |
| diacylated peroxides of aliphatic acids | $C_{10}$–$C_{12}$ – 12 |

Duration of the process till the 27-percent styrene conversion at 75°–85° C., 6 hours, the Fordwick's viscosity, 49 seconds.

Prepolymer-to-aqueous phase ratio, 6:3. Tricalcium phosphate is taken in an amount of 0.35 weight part, disubstituted sodium alkylsulphate, 0.008 weight part, calcium carbonate, 0.20 weight part. Used as the initiators at the stage of aqueous-suspension polymerization are benzoyl peroxide (0.30 weight part) and tertbutylperbenzoate (0.30 weight part), both in terms of the oil phase.

Suspension polymerization temperature conditions:
elevation to 90° C. — one hour, holding at 90° C. — 4 hours,
elevation to 130° C. — 2 hours, holding at 130° C. — 2 hours.

The process is characterized by stability; no sticking of the reactants to the reactor walls practically occurs; the product features the same physical and mechanical characteristics as the polymer produced in Example 1.

EXAMPLE 5

The process runs under the conditions similar to those of Example 1, with the exception that used as an elastomer component is the block-copolymer of divinyl with styrene (weight ratio 30:70), taken in amount of 13.2 weight parts.

The conditions of the suspension stage of the polymerization process are the same as in Example 1, with the exception that the aqueous phase is charged into the prepolymer at 80° C.

The thus-obtained polymer features the following physico-mechanical characteristics:
Charpy notched impact strength—8.3 kgf-cm/cm$^2$
residual monomer content—0.03 wt.%
percentage elongation—31
flow melt index—4.5 g/10 min
Vicat's softening point — 100° C.

EXAMPLE 6

The process is carried out under the conditions similar to those of Example 2, with the exception that used as an elastomer component is butadiene-styrene rubber. Physico-mechanical characteristics of the product obtained are the same as of the polymer of Example 1.

What is claimed is:

1. A process for producing shock-proof graft copolymers of styrene with synthetic rubber, residing in that rubber is dissolved in styrene at a maximum temperature of 75° C.; the resultant solution is subjected to prepolymerization by being heated to 75°–85° C. in the presence of a plasticizer and a peroxide initiating agent of the following formulation:
diacylated peroxides of aliphatic acids $C_3$–$C_5$—2–8 weight parts;
diacylated peroxides of aliphatic acids $C_6$–$C_9$—80–89 weight parts;
diacylated peroxides of aliphatic acids $C_{10}$–$C_{12}$—7–14 weight parts, until 25–40 percent of the styrene has been converted to form the prepolymer;
then said prepolymer is exposed to aqueous-suspension polymerization by being heated in an aqueous medium to maximum 140° C., at a prepolymer-to-water volume ratio ranging between 5:3 and 10:3, respectively, in the presence of peroxide polymerization initiators and a stabilizing system, consisting of 0.15–1.5 wt.% tricalcium phosphate, 0.003–0.02 wt.% of a mixture of disubstituted sodium alkylsulphates having a general formula: R—OSO$_3$Na, where R is a hydrocarbon radical, containing 8 to 18 carbon atoms, and 0.15–0.35 wt.% calcium carbonate.

2. A process as claimed in claim 1, wherein used at the stage of aqueous-suspension polymerization is the peroxide composition, consisting of diacylated peroxides of aliphatic acids $C_3$–$C_{12}$ in combination with a high-temperature peroxide initiator.

3. A process as claimed in claim 2, wherein used as high-temperature peroxide initiators are peroxides selected from the group, consisting of tertbutylperbenzoate and tertbutyl peroxide.

4. A process as claimed in claims 1, wherein used as the peroxide composition is the system, consisting of:
diacylated peroxides of aliphatic acids $C_3$–$C_5$—2 weight parts;
diacylated peroxides of aliphatic acids $C_6$–$C_9$—89 weight parts;
diacylated peroxides of aliphatic acids $C_{10}$–$C_{12}$—9 weight parts.

5. A process as claimed in claim 1, wherein used as the peroxide composition is the system, consisting of:
diacylated peroxides of aliphatic acids $C_3$–$C_5$—6 weight parts;
diacylated peroxides of aliphatic acids $C_6$–$C_9$—80 weight parts;

diacylated peroxides of aliphatic acids $C_{10}$–$C_{12}$—14 weight parts.

6. A process as claimed in claim 1, wherein used as the peroxide composition is the system, consisting of:

diacylated peroxides of aliphatic acids $C_3$–$C_5$—8 weight parts;

diacylated peroxides of aliphatic acids $C_6$–$C_9$—80 weight parts;

diacylated peroxides of aliphatic acids $C_{10}$–$C_{12}$—12 weight parts.

7. A process as claimed in claim 1, wherein said diacylated peroxides are obtained by the acylation of hydrogen peroxide with a mixture of aliphatic acid chlorides having from 3–12 carbon atoms.

* * * * *